(12) United States Patent
Seemann et al.

(10) Patent No.: US 7,913,225 B2
(45) Date of Patent: Mar. 22, 2011

(54) ERROR HANDLING USING DECLARATIVE CONSTRAINTS IN A GRAPHICAL MODELING TOOL

(75) Inventors: Jochen Seemann, Duvall, WA (US); Gareth A. Jones, Lower Cambourne (GB); Stuart J. H. Kent, Canterbury (GB); Patrick S. Tseng, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1250 days.

(21) Appl. No.: 11/413,830

(22) Filed: Apr. 28, 2006

(65) Prior Publication Data

US 2008/0010597 A1    Jan. 10, 2008

(51) Int. Cl.
*G06F 9/44* (2006.01)
(52) U.S. Cl. ........ 717/117; 717/105; 717/107; 715/746; 715/762
(58) Field of Classification Search .......... 717/100–126, 717/168; 715/764–769, 746, 762
See application file for complete search history.

(56) References Cited

U.S. PATENT DOCUMENTS

| 5,544,267 | A | * | 8/1996 | Mahoney et al. | 382/317 |
|---|---|---|---|---|---|
| 6,246,403 | B1 | * | 6/2001 | Tomm | 715/762 |
| 7,562,340 | B2 | * | 7/2009 | Kosov et al. | 717/105 |
| 7,680,632 | B1 | * | 3/2010 | Aldrich | 703/1 |
| 2006/0075387 | A1 | * | 4/2006 | Martin et al. | 717/124 |

OTHER PUBLICATIONS

Brad A. Myers, User interface software tools; ACM Transactions on Computer-Human Interaction (TOCHI) archive, vol. 2, Issue 1 (Mar. 1995), pp. 64-103.*

* cited by examiner

*Primary Examiner* — Wei Y Zhen
*Assistant Examiner* — Satish Rampuria
(74) *Attorney, Agent, or Firm* — Workman Nydegger (57) ABSTRACT

Use of declarative constraints in an error validation framework of a graphical modeling tool. The declarative constraints define one or more rules that objects of a graphical model should adhere to. When enforced against the graphical model, objects that do not conform to the rules may be identified. A declarative relationship between the non-conforming object and its visual representation in a graphical diagram may be used to allow for visually identifying the visual representation in the graphical diagram.

18 Claims, 9 Drawing Sheets

ERROR HANDLING USING DECLARATIVE CONSTRAINTS IN A GRAPHICAL MODELING TOOL

CROSS-REFERENCE TO RELATED APPLICATIONS

Not applicable.

BACKGROUND

Computing technology has contributed enormously to the advancement of humankind. Computing systems come in a wide variety of physical forms including desktop computers, laptop computers, personal digital assistants, telephones, and even devices that have not been conventionally thought of as computing systems such as, for example, refrigerators and automobiles. Thus, a computing system may be any device or system that has a processor and a memory of any type.

One common application that computing technology supports are graphical modeling tools (also called "graphical designers"). Graphical modeling tools facilitate the orderly and efficient construction of graphical models. Graphical models include the visual representation of a collection of interrelated objects. Graphical models may be used in a different way by a wide variety of domains. For instance, workflows, organization charts, electrical circuits, software architectures, software flowcharts, may each be represented using graphical models. There may be literally thousands of different applications in which graphical modeling tools may be useful. In each case, the types of objects and interrelationships may be quite different. Even within a single domain of application, there may be definite preferences on how the objects and interrelationships are displayed. For instance, one bank may prefer one graphical modeling style for representing economic transactions, while another bank may represent a different graphical modeling style for economic transactions.

Building graphical modeling tools is a challenging and time consuming task. The building of a typical graphical designer may involve a software developer implementing a design surface that implements the graphical notation, a toolbox that allows the user to drag and drop element onto the design surface, a mechanism for representing properties of the objects on the design surface—the properties representing meaningful information about the problem the user is trying to model, and other User Interface (UI) elements to navigate through the model data.

Errors in the graphical models created by the graphical modeling tools are often detected by checking constraints against the model. The constraints typically include rules that the graphical designer builder desires the graphical model to follow. However, many graphical modeling tools require that a constraint be hard coded for a specific graphical model. When one considers the large amount of possible graphical models, the task of creating hard coded constraints for each model may seem ominous.

In addition, when a constraint is checked against the graphical model, the graphical modeling tool often identifies objects of the model that do not conform with the constraint. A user of the graphical modeling tool must then determine which object of a visual diagram corresponds to the non-conforming object of the graphical model. This task may be time consuming and difficult, especially if the visual diagram is complex.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example embodiments allow declarative statements of constraints to govern how a visualization of a graphical model is validated. In these embodiments, a computing system reads a declarative constraint that includes one or more rules that a graphical model should adhere to in order to comply with the declarative constraint. The computer system also identifies a graphical model that will be subjected to the declarative constraint. The declarative constraint is then interpreted by the computing system to identify or formulate underlying code. When executed, the underlying code causes the rules of the declarative constraint to be checked against the identified graphical model. The computing system may then execute the underlying code.

Other example embodiments identify validation errors in a visual representation of a graphical model. In these embodiments, a computing system may identify an object of a graphical model that does not conform with one or more rules of a constraint that is imposed on the graphical model. The computing system then reads a declarative definition of the graphical model to determine a declarative relationship between the non-conforming object of the graphical model and a visual representation of the object that is visualized on a display. The computing system interprets the declarative relationship of the object and its visual representation to formulate underlying code that when executed causes the computing system to provide a visually district attribute related to the visual representation on the display. The computing system may then execute the underlying code.

Additional embodiments identify non-compliance with a declarative constraint. For instance, a graphical diagram is displayed that includes one or more visual objects that represent one or more objects of a graphical model. A declarative constraint that includes rules that the graphical model should adhere to in order to comply with the constraint is then accessed. The declarative constraint is associated with underlying code that when executed causes the rules to be enforced against the graphical model. User interaction that causes the underlying code to be executed is received. As a result of the execution, objects of the graphical model that do not conform with the rules of the constraint are identified.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the present invention extend to the use of declarative constraints in an error validation framework of a graphical modeling tool. The declarative constraints define one or more rules that objects of the graphical model should adhere to. When enforced against the graphical model, objects that do not conform to the rules may be identified. Embodiments of the present invention also extend to using a declarative relationship between a non-conforming object and its visual representation in a graphical diagram to allow for visually identifying the visual representation in the graphical diagram. First, an example computing system will be described in which the principles of the present invention may be used with respect to FIG. 1. Then, the principles of the present invention will be described in further detail with respect to the subsequent Figures.

Figure 1:
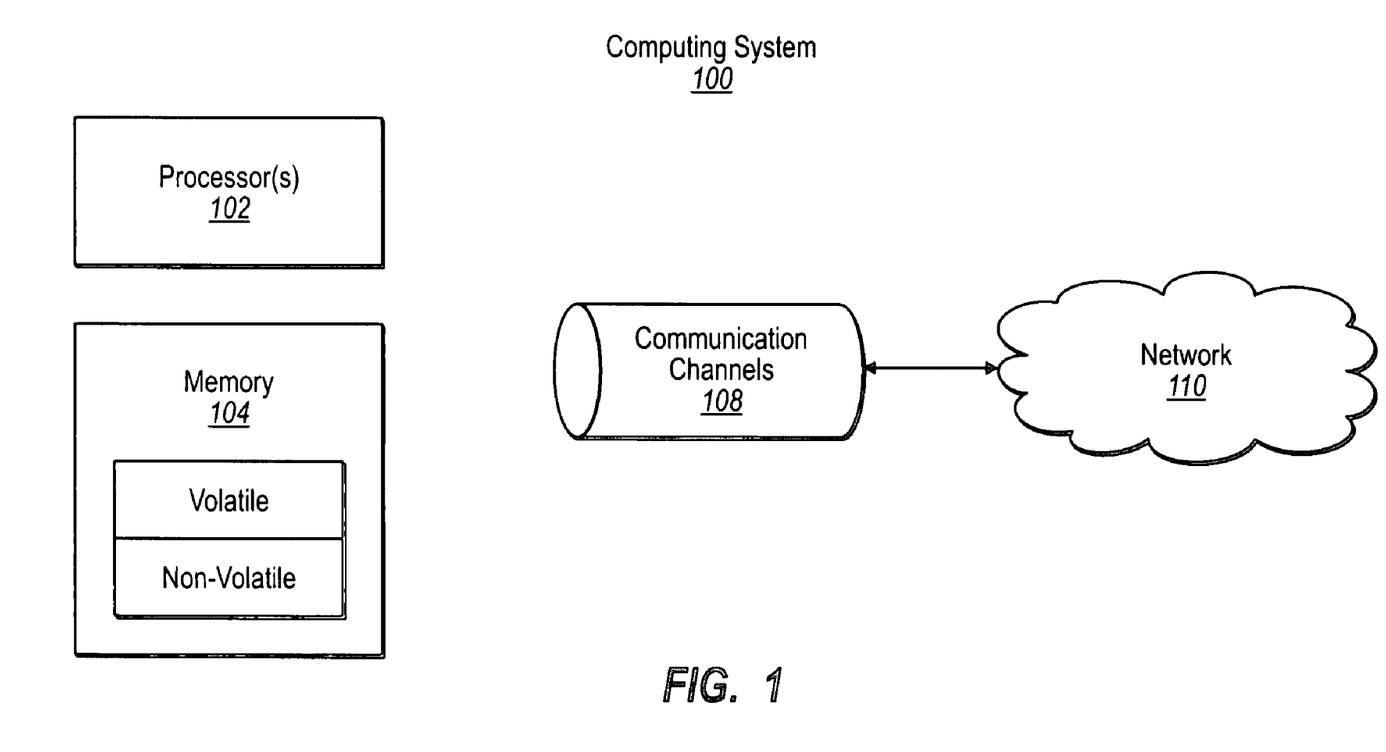
FIG. 1 illustrates a computing system in which embodiments of the principles of the present invention may operate.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
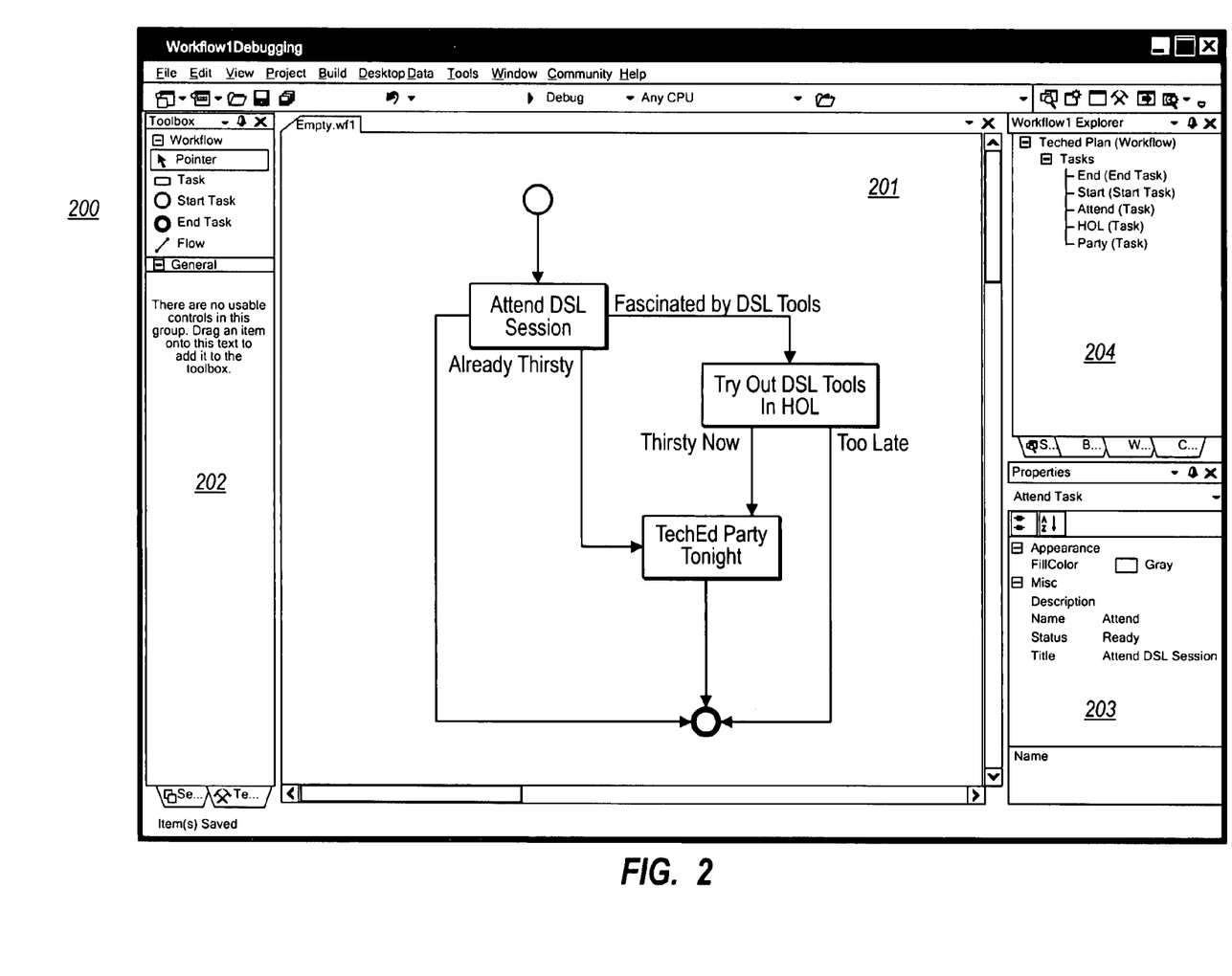
FIG. 2 illustrates a user interface that displays a graphical designer.

FIG. 2 illustrates a user interface 200 that displays a graphical designer: In this description and in the claims, a "graphical designer" or "graphical modeling tool" is any application that permits the construction of a graphical model of one or more visualized objects and interrelationships. A single application in some cases may support multiple graphical designers. As previously mentioned, different application domains and preferences may warrant different object classes, interrelationships, and visualizations of the same. Accordingly, the term "graphical designer" and "graphical modeling tool" is a broad term that is by no means restricted to the example that will now be described with respect to FIG. 2.

The user interface 200 includes a design surface 201 that implements the graphical notation, a toolbox pane 202 that allows the user to drag and drop element onto the design surface, a property pane 203 for representing properties of the object on the design surface, and a navigation pane 204 to navigate through the model data.

The graphical designer 200 may be used to construct a variety of models. However, each graphical designer 200 will permit certain types of object classes, relationships, and visualizations of the same. The graphical designer is defined in a declarative manner using a declarative definition. Instead of using a list of detailed instructions provided to a computer to define the graphical designer, the graphical designer declarative definition specifies a set of declarative definitions that each defines an associated element of the graphical designer. The "element" may be any aspect of the graphical designer including, for example, object classes, relationships visualizations of the same, or any other aspect of the graphical designer (visualized or non-visualized). At some future point, the declarative definition may be interpreted by an interpreter or a code generator to generate instructions sequences that abide by the specification defined by the declarative definitions. One way of representing a declarative definition of a graphical designer is using an eXtensible Markup Language (XML) document. However, the declarative definition may be represented in binary or other non-text forms as well. The implementation of a given element of the graphical designer may be altered by simply altering the declarative definition describing the element, rather than altering executable code that implements details of the graphical designer.

As just mentioned, the declaration definition of the graphical designer may be in the form of an eXtensible Markup Language (XML) document. In one embodiment, the declarative definition of the graphical designer may include domain model components in the form of object classes that are specific to the particular problem domain and that thus define specific objects, their properties, and relationship types between the objects. Depending on the problem domain, these elements may vary considerably. For instance, if the graphical designer were used in financial applications, object classes might include currencies, payments, invoices, and the like. If the graphical designer were used in scheduling applications, the object class might include tasks, order of completion dependencies, and the like. If a user builds a designer to model the structure of a computer network, the user might define an object called "Server" with properties like "Operating System" and "Storage Capacity", and relationships like "Network Connection".

Domain models may include three kinds of elements: domain classes, relationships among domain classes (which themselves also have the properties of domain classes), and enumerations. Each of these elements may appear in a schema definition and may be reused independently by referencing the element from another designer.

The graphic designer declarative definition may also include notation elements that may be used to visualize objects and relationships of the design model. For example, in the computer networking domain, the graphical designer might use an icon to visualize the "Server" object and show the name of the "Server" object as text next to the icon. The network connection might be visualized using an arrow to another "Server" object.

The notation definition may specify three kinds of elements: shapes, connectors and decorators. For instance, the shapes may be geometry shapes (using predefined geometries like 'Rectangle'), image shapes in which the object is represented as an image, or a complex shape with rich behavior. Connectors are elements that connect two shapes. For connectors, the designer builder can specify which type of shape can be connected to which other type of shape by this connector. Decorators add text or icons to shapes and connectors. Each of these elements may also appear in the schema definition for the declarative definition of the graphical design.

The declarative definition may also include a mapping definition. The mapping definition specifies which elements of the domain model are associated with which elements of the notation. For example, in the sample mentioned above, the graphical designer may map the domain object for "Server" to the shape that is used to visualize the "Server" object.

The mapping definition specifies four kinds of elements: TextDecoratorMaps, IconDecoratorMaps, ShapeMaps, and ConnectorMaps. The TextDecoratorMaps or IconDecoratorMaps map values displayed in a decorator to values of an object. ShapeMaps maps the shape itself to one or more objects. This mapping is depending on the type of the shape. Each ShapeMap may contain a list of DecoratorMaps for this shape. ConnectorMaps map the connector to a relationship between two domain objects. Each ConnectorMap may contain a list of DecoratorMaps for this connector. Once again, each of these elements may appear in the schema definition file for the graphical design declarative definition.

Figure 3:
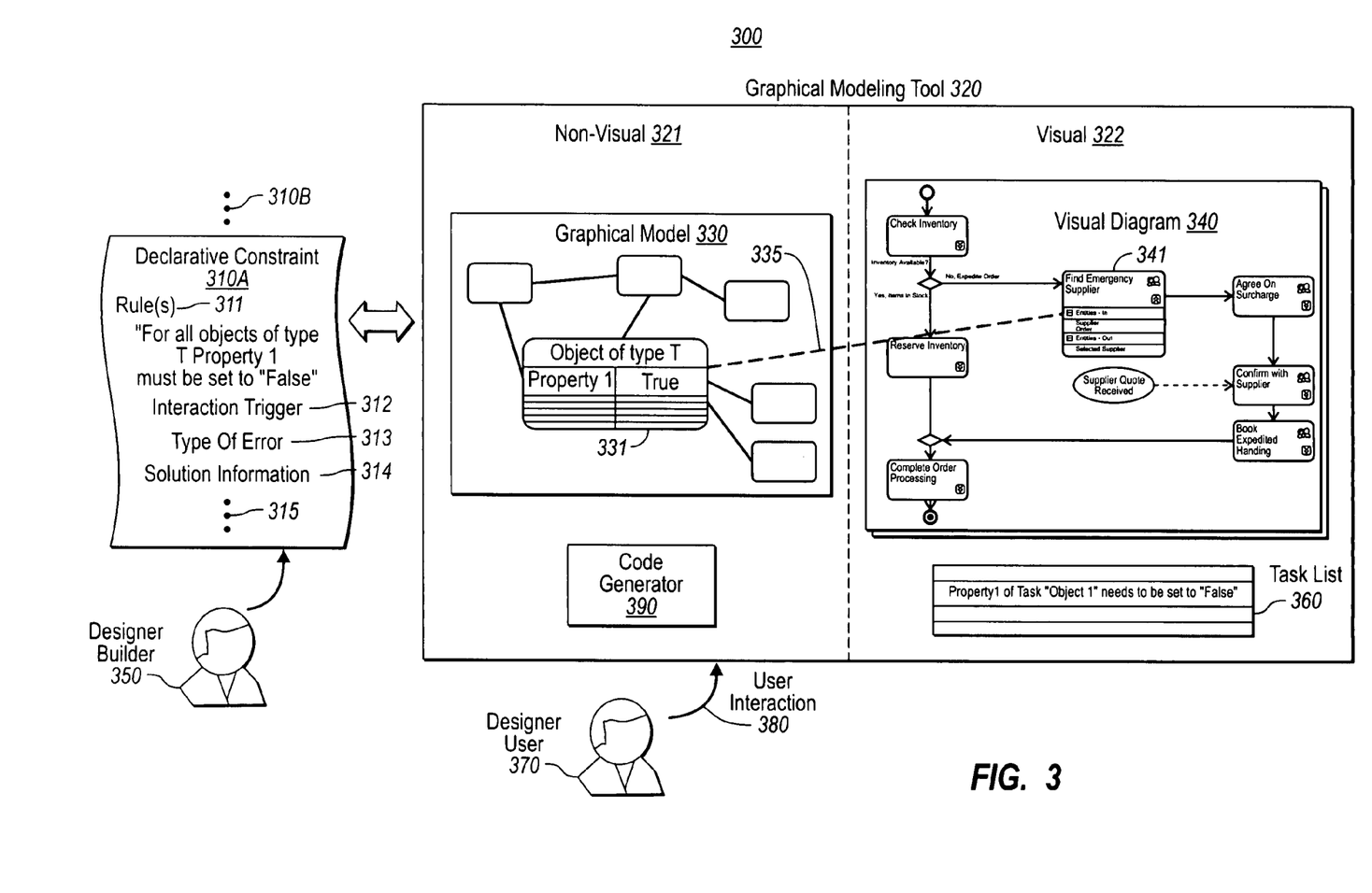
FIG. 3 illustrates a computing system including a graphical modeling tool in which the embodiments disclosed herein may be performed.

Turning now to FIG. 3, a computing system 300 that may be implemented to practice the embodiments disclosed herein is illustrated. Computing system 300 depicts various modules and components that can be used when implementing the embodiments. Note that computing system 300 is illustrated by way of example only and should not be used to limit the scope of the appended claims or any of the embodiments disclosed herein. Computing system 300 may correspond to computing system 100 of FIG. 1, although this is not required.

As illustrated, computing system 300 may include a graphic modeling tool 320 that may correspond to the graphical designers or modeling tools previously discussed in relation to FIG. 2. As mentioned, graphical modeling tool 320 is used to create, display, and modify graphical models and to display visual representations of the graphical models. As illustrated, graphical modeling tool 320 includes a graphical model 330 that may include objects and relationships defined declaratively as previously described. Graphical modeling tool 320 also includes a visual diagram 340 that is a visual representation of at least some of the objects of graphical model 330. The graphical modeling tool 320 may include various User Interface (UI) elements such as task list 360 that allow for displaying information. The graphical modeling tool may also include a code generator 390, which may be implemented as software, hardware, or any combination of the two. Note that FIG. 3 shows graphical modeling tool as having a non-visual portion 321 and a visual portion 322. The portions 321 and 322 are included to illustrate that an end user of the modeling tool 320 typically only sees the elements that are shown in the visual portion 322. The elements shown in non-visual portion 321 typically are not displayed on a screen by graphical modeling tool 320. In other words, graphical modeling tool 320 includes both visually displayed elements and elements that are not displayed.

Computing system 300 may also include a declarative constraint 310A and any number of additional constraints as illustrated by ellipses 310B that are created by a designer builder 350, which may be a human user or a computing entity. The declarative constraints 310 may each define one or more rules that a graphical model such as graphical model 330 should adhere to in order to comply with the constraint. In some embodiments, the declarative constraints 310 may be written in a declarative language such as XML. Instead of using a list of detailed instructions provided to a computer to define the declarative constraint, the declarative constraint definition specifies a set of declarative definitions that each defines the portions of the declarative constraint that will be discussed below. An interpreter module or code generator 390 of computing system 300 may at a later time generate or formulate the instructions sequences that abide by the specifications defined by the declarative constraints. When executed, this code will cause the rules of the constraint to be checked against a graphical model such as model 330.

In other embodiments, the constraints 310 may be created by a designer builder 350 in a computing language such as C Sharp (C#). The designer builder 350 may then implement a declarative statement in a declarative definition of a graphical designer or model that calls or otherwise identifies the constraint to be executed. When executed, this code also causes the rules of the constraint to be checked against a graphical model such as model 330. Accordingly, "declarative constraint" is defined to mean in the description and in the claims a constraint that is defined declaratively or a constraint that is called or identified declaratively.

As mentioned, the declarative constraint 310A may include one or more rules 311 that specify how the graphical model should function. For example, the one or more rules 311 may specify properties, parameters, and relationships that objects of graphical model 330 should adhere to. For instance, as illustrated in FIG. 3, a rule 311 may state "For all objects of type T: Property 1 must be set to 'False'". In other words, property 1 of an object of type T must be set to false in order for the graphical model to adhere to the constraint 310A. Note that although only described for constraint 310A, the other constraints 310 may also include one or more rules 311 and the other constraint elements that will be described below.

In some embodiments, declarative constraint 310A may also define one or more user interactions 312 that specify when the rules 311 should be checked or validated against the graphical model. For example, interactions 312 may specify that any time the graphical model 320 is opened or saved by a user, the rules 311 should be validated. The interactions 312 may also specify that interacting with a menu such as a context menu may cause the rules 311 to be validated. Of course, the designer builder 350 may also specify any number of additional custom interactions 312 that will cause the rules 311 to be checked or validated against the graphical model. Accordingly, any reference to a specific interaction in this description is for illustration only and should not be used to limit the scope of the embodiments disclosed herein.

In further embodiments, constraint 310A may include one or more error types 313 that may be displayed by the task list 360 of graphical modeling tool 320 when an object of the graphical model 330 violates rule 311. For example, the error statement 313 may specify whether a warning or an error should be flagged for the violating object(s). There may also be other error types that may also be displayed.

Additional embodiments of constraint 310A may further include solution information 314. Solution information 314 may include instructions that specify how to fix an identified error in graphical model 330. When constraint 310A is executed by a processor of computing system 300, graphical modeling tool 320 may insert a UI element such as drop down or context menu such as a smart tag that includes solution information 314. A user may then access the solution information 314 to ascertain how to fix the identified error.

The following represents an example of a constraint 310 that may be used to practice the embodiments disclosed herein, and is provided by way of illustration only.

```
[ValidationState (ValidationState.Enabled)]
public partial class ModelClass
{
    [ValidationMethod (ValidationCategories.Open |
        ValidationCategories.Save | ValidationCategories.Menu)]
    private void TestDullicateAttrName (ValidationContext context)
    {
        StringCollection names = new StringCollection ( ) ;
        foreach ( ModelAttribute attr in this.Attributes)
        {
          if (names.Contains (attr.Name))
          {
              // If the class has two attribute of same name. Flag a warning.
              Context.LogWarning ("X5.Val__TestX5 adfadsf", "Code X",
 new ModelAttribute [ ] { this.Attributes [0], this.Attributes [1] });
          }
          else
          {
              Names.Add (attr.Name);
          }
       }
    }
    [ValidationMethod (ValidationCategories.Open |
              ValidationCategories.Save)]
    private void ValidateClassName (ValidationContext context)
    {
       if (this.Name = = "class" )
       {
         // Here, our specific error is that the class name cannot be called
         "class" Context.LogError( this.Name, "Code X", this) ;
       }
    }
}
```

The first two lines of the above constraint are used to tie the constraint into a declarative definition of a graphical model as will be explained in more detail to follow. These lines also enable the model class that will be validated.

The next section of the constraint shows examples of interactions 312 that may cause the constraint to be executed based on a declarative statement in a declarative definition of the graphical model that will be describe below. These interactions are opening and saving the graphical model and using a menu. This section also specifies the rule 311 and the error type 313. In this example, the rule states that if a class has two attributes with the same name, a warning should be flagged. The constraint also includes code that will provide pointers to any objects that fail to comply with the stated rule.

The last section of the code also includes examples of interactions. In this case the interactions are opening and saving the graphical model. The rule in this section states that a class cannot have the name "class". If this happen, an error is flagged.

As mentioned above, a designer builder 350 creates the constraint 310. The designer builder 350 typically will include a rule 311 in the constraint and may also include the other elements discussed. In addition, the designer builder 350 may further include other information not previously discussed as circumstance warrant. This is illustrated by ellipses 315.

The designer builder may create a constraint 310 prior to implementing graphical model 330. Alternatively, constraint 310 may be created after the implementation of graphical model 330.

As previously discussed in relation to FIG. 2, graphical model 330 may have a declarative definition that defines the objects, properties, and relationships of the graphical model 330. In order to tie a constraint 310 to a particular graphical model 330, the designer builder 350 also includes declarative statements in the declarative definition of the graphical model that enable the validation framework of the graphical modeling tool 320 to call the specified constraint and enables the validation framework. For example, the following XML snippet may be included in the declarative definition.

<validation open="false" save="true"menu="true"custom="false">

This XML snippet enables the validation framework by globally stating which interactions will activate the validation framework. In this example, "save" and "menu" are set to true, which means that upon saving the graphical model or selecting a menu such as a context menu the constraint will be executed. "Open" and "custom" are set to false, which means that opening the graphical editor will not trigger the validation framework. In addition, any custom validation scheme will also not trigger the validation framework. Note that the designer builder 350 may change the above values from true to false or from false to true as circumstances warrant to allow interactions of the designer's choice to trigger the validation framework.

In addition to the above XML snippet, the designer builder 350 may also include declarative statements that call or identify the desired constraint 350. For example, the following statements may be used to identify the example constraint discussed previously. By adding such statements, the designer builder 350 ties the constraint to the declarative definition of the graphical model, where it can be used by the validation framework.

[ValidationState (ValidationState.Enabled)]
public partial class ModelClass

Referring again to FIG. 3, a designer user 370 may then use graphical modeling tool 320 to create or modify graphical model 330 in the manner previously described in relation to FIG. 2. The resulting visual diagram 340 is then displayed on the display of graphical modeling tool 320. Note that designer user 370 and designer builder 350 may be the same entity. In addition, both may be a single person, group of people, enterprise, etc.

Upon completion of the graphical model 330 or at some other time, the designer user 370 may provide one or more user interactions 380 that cause the constraints 310 to be checked or validated against graphical model 330. For example, the user interaction 380 may be designer user 370 opening or saving graphical model 330. Alternatively, the designer user 370 may provide interaction 380 by selecting a context menu. The designer user 370 may also provide previously defined custom interactions 380 that trigger the validation framework. The type(s) of user interaction 380 that will trigger the validation is defined by designer builder 350 in the manner previously discussed above.

Upon receiving the user interaction, the graphical modeling tool 320 accesses the declarative constraints 310 that were specified in the declarative definition of graphical model 330. As mentioned, the declarative definition identifies that graphical model 330 is to be subjected to the declarative constraint.

An interpretation module of computing system 300 then reads and interprets the specified declarative constraints 310 to identify or formulate underlying executable code that when executed cause the rules 311 of the specified constraint 310 to be checked against model 330. One or more processors of computing system 300 may then execute the code.

For example, as illustrated, rule 311 of constraint 310A in FIG. 3 states that Property1 of objects of type T must be "false". Computing system 300 identifies or formulates underlying code that causes this rule to be checked against graphical model 330. The execution of the underlying code also identifies which, if any, objects of the graphical model violate rule 311.

In like manner, if the example constraint discussed above where specified in the declarative definition of graphical model 330, it would be accessed by graphical modeling tool 320. The constraint code would then be read and identified by the computing system. The code would then be executed, which would cause the two discussed rules to be checked against model 330. For example, the objects of graphical model 330 that had the same name would be identified and a warning flag would be triggered. Similarly, the objects of graphical model 330 that were named "class" would be identified and would trigger an error warning.

The objects of graphical model 330 that were identified as being non-compliant with one or more rules 311 of a declarative constraint are then passed back to graphical modeling tool 320. Specifically, graphical modeling tool 320 may provide one or more UI elements that allow for the listing or other display of the non-compliant objects to inform a designer user 370 of the constraint violations. For example, a UI element such as task list 360 may be utilized to display a list of the non-compliant objects. The UI element may also list or otherwise provide instructions 314 and/or error type 313 for display. As illustrated in FIG. 3, the task 360 may display the following if the illustrated rule 311 was violated: "Property1 of Task 'Object1' needs to be set to False'". This statement includes both an identification of the non-compliant object and instructions on how to fix the error.

As previously mentioned, errors in graphical model 330 are detected by checking the rules of the declarative constraint 310 against the objects of graphical model 330. However, designer user 370 does not see the objects of graphical model 330. Instead, designer user 370 sees visual diagram 340, whose elements visually represent the objects of graphical model 330. Accordingly, some embodiments of graphical modeling tool 320 include a mechanism for visually identifying the visual objects of visual diagram 340 that correspond to the non-compliant object of the graphical model. This enables the designer user 370 to quickly navigate to the identified visual object and ascertain the detected error.

For example, designer user 370 may access the task list 360 or other UI element that identifies the objects of graphical model 330 that do not conform to the rules 311 of a declarative constraint 310. The designer user 370 may then select an identified object in the task list 360 by double clicking on the object or some similar action.

As discussed in relation to FIG. 2, the declarative definition of graphical model 330 includes notation definitions that specify the shapes, connectors, and decorators that are used to visualize objects and relationships of the graphical model.

These notation elements may be displayed as part of visual diagram 340. The declarative definition of the graphical model 330 also includes a mapping definition which specifies which elements of the graphical model are associated with which elements of the notation. In other words, the declarative definition includes a mapping between an object and its visual representation. Graphical modeling tool 320 is able to exploit this known mapping to facilitate visually identifying the visual objects of visual diagram 340 that correspond to the non-compliant object For example, graphical modeling tool 320 reads the declarative definition of graphical model 330 to ascertain the known declarative mapping relationship between the non-compliant object and its visual representation or notation. This enables graphical modeling tool 320 to identify which element of visual diagram 340 represents the non-conforming object of graphical model 330. The mapping relationship is illustrated in FIG. 3 as dashed line 335, which shows the declarative mapping relationship between object 331 of the graphical model 330 and element 341 of visual diagram 340.

An interpretation module or code generator 390 of graphical modeling tool 320 may then interpret the declarative relationship between the non-conforming object and its visual representation to generate underlying code. This underlying code, when executed by a processor of computing system 300, causes graphical modeling tool 320 to provide a visually distinct attribute to the visual element 341 in visual diagram 340 that represents the non-conforming object 331. In some embodiments, the underlying code, when executed, also guides or navigates designer user 370 to the visual element in visual diagram 340. This is especially useful for a visual diagram 340 that includes multiple diagrams that may not all be displayed at the same time.

There are several different ways that graphical modeling tool may provide the visually distinct attribute to element 341. For example, in some embodiments graphical modeling tool 320 may highlight, draw a shape around, or otherwise visually mark element 341.

In further embodiments, graphical modeling tool 320 may provide a UI element such as a smart tag in close proximity to the element 341. In some embodiments, the smart tags may be icons with a context or dropdown menu and some specialized behaviors (e.g. they don't zoom with the document/drawing they're on). As discussed, the smart tag may include solution information 314 that was included in a declarative constraint 310. In such case, the underlying code, when executed, would cause graphical modeling tool 320 to access the solution information in the declarative constraint and to generate appropriate code for displaying this information in the smart tag. The designer user 370 may then read the smart tag information and ascertain what steps should be taken to fix the error in the graphical model.

In other embodiments, graphical modeling tool 320 may generate executable code for inclusion in the smart tag. In such embodiments, the graphical modeling tool 320 would access the solution information 314 in a declarative constraint 310 as described. However, code generator 390 would interpret the solution information and generate the executable code, that when executed by a processor of computing system 300, would automatically fix the error in the graphical model 330. For example, designer user 370 may simply double click on an element of the smart tag and cause the execution of the code to fix the error.

Figure 4:
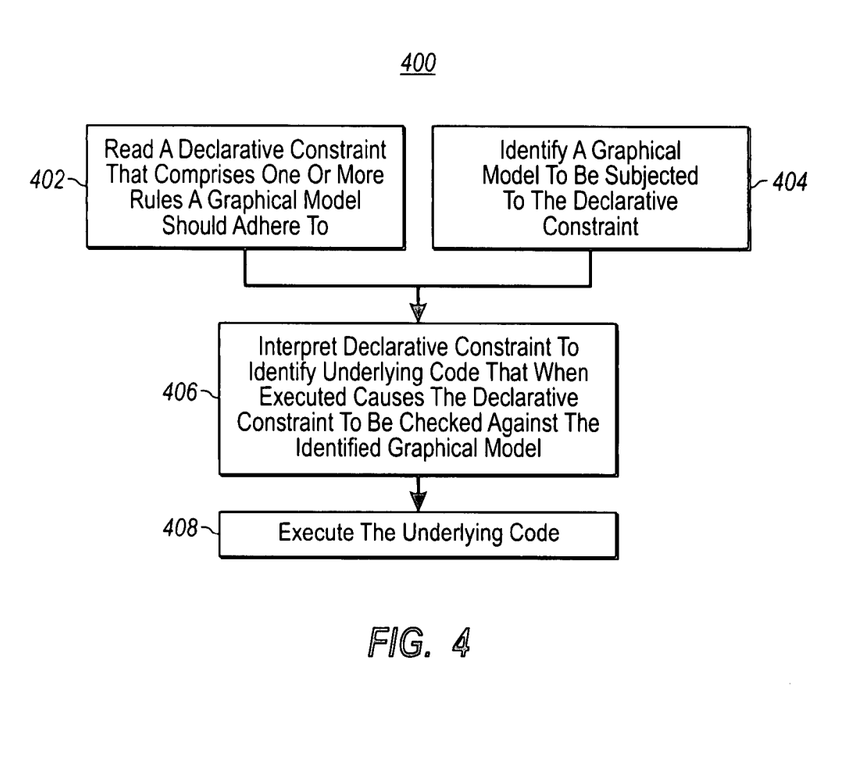
FIG. 4 illustrates a flowchart of a method for allowing declarative statements of constraints to govern how a visualization of a graphical model is validated in accordance with one embodiment disclosed herein.

FIG. 4 illustrates a method 400 for a computing system to allow declarative statements of constraints to govern how a visualization of a graphical model is validated. Method 400 will be described with frequent reference to the computing system of FIG. 3. Note, however, that the computing system of FIG. 3 is only one of numerous computing systems that may be employed to practice method 400.

Method 400 includes an act of reading a declarative constraint that comprises one or more rules that a graphical model should adhere to in order to comply with the declarative constraint (act 402). For example, computing system 300 may read a declarative constraint 310 that is separate from a declarative definition of a graphical model and that includes one or more rules 311. The rules 311 may specify properties, parameters, and relationships that objects of graphical model 330 should adhere to. The declarative constraint 310 may be written in a declarative language such as XML or it may be written in some other code that is called declaratively by a graphical modeling tool as described above.

The declarative constraint may also define one or more interactions 312 that will cause the constraint to be triggered. In addition, the declarative constraint may include an error type 313 that is flagged when a validation error occurs and/or solution information 314 that specifies how to fix a validation error. In some embodiments, the solution information 314 may be used to create a smart tag.

Method 400 also includes an act of identifying a graphical model that will be subjected to the declarative constraint (act 404). For example, the computing system 300 may identify that graphical model 330 is to be subjected to a declarative constraint 310. As discussed, in some embodiments a designer builder 350 may insert declarative information into the declarative definition of a graphical model such as graphical model 330. This declarative information declaratively calls or otherwise identifies a constraint 310 that graphical model 330 will be subjected to.

Method 400 further includes an act of interpreting the declarative constraint to identify or formulate underlying code that when executed causes the one or more rules associated with the declarative constraint to be checked against the identified graphical model (act 406). For example, an interpretation module or code generator of computing system 300 such as code generator 390 may interpret the declarative language of the constraint and may formulate underlying code that will cause the rules 311 to be checked against graphical model 330. Alternatively, the code of the declarative constraint 310 may be identified as causing the rules to be checked when executed.

In addition, method 400 includes an act of executing the underlying code (act 408). For example, a processor of computing system 300 (e.g., processor 102 of FIG. 1) may execute the underlying code to cause the rules to be checked against graphical model 330. In some embodiments, the executed underlying code may also cause computing system 300 to identify those objects of graphical model 330 that do not conform with the rules 311. For example, a task list 360 may be utilized to list the non-conforming objects.

Figure 5:
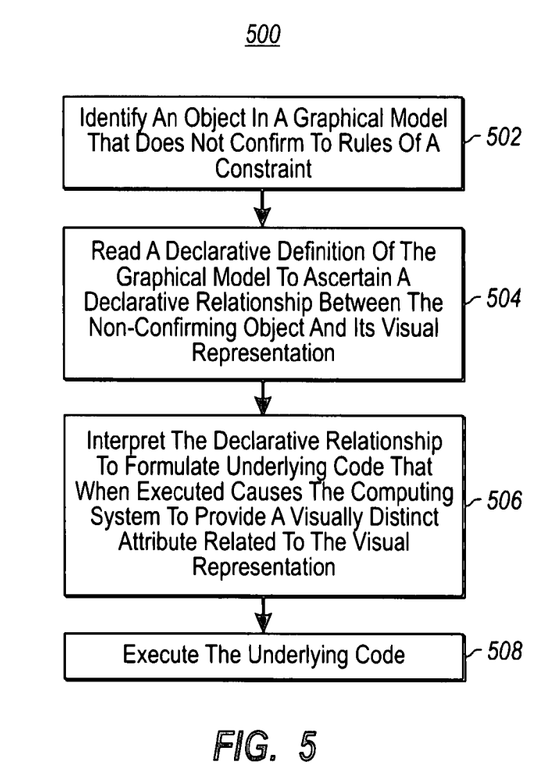
FIG. 5 illustrates a flowchart of a method for identifying validation errors in a visual representation of a graphical model in accordance with another embodiment disclosed herein.

FIG. 5 illustrates a method 500 for a computing system to identify validation errors in a visual representation of a graphical model. Method 500 will be described with frequent reference to the computing system of FIG. 3. Note, however, that the computing system of FIG. 3 is only one of numerous computing systems that may be employed to practice method 500.

Method 500 includes an act of identifying an object in a graphical model that does not conform with one or more rules of a constraint that is imposed on the graphical model (act 502). For example, a constraint 310 may be checked against graphical model 330 by computing system 300 according to the acts of method 400, although this is not required. Any non-conforming objects may then be listed or otherwise displayed on a UI element of graphical modeling tool 320 such as task list 360.

Method 500 also includes reading a declarative definition of the graphical model to ascertain a declarative relationship between the non-conforming object of the graphical model and its visual representation that is visualized on a display (act 504). For example, computing system 300, specifically graphical modeling tool 320, may read the declarative definition of graphical model 330. From this declarative definition, the graphical modeling tool 320 may ascertain the declarative mapping or relationship between the model object and its visual representation that is displayed in the graphical modeling tool. The declarative mapping allows graphical modeling tool 320 to identify which displayed element represents a non-conforming model object. For instance, the declarative mapping or relationship 335 identifies that element 341 visually represents object 331.

Method 500 further includes an act of interpreting the declarative relationship between the non-conforming object of the graphical model and its visual representation to formulate underlying code that when executed causes the computing system to provide a visually district attribute related to the visual representation on the display (act 506). For example, code generator 390 interprets the declarative mapping or relationship and formulates underlying code that, when executed causes graphical modeling tool 320 to provide the visually distinct attribute. For instance, a visually distinct attribute may be added to element 341.

Method 500 additionally includes an act of executing the underlying code (act 508). For example, processor 102 may execute the code formulated in act 506. As mentioned, the executed code causes a visually distinct attribute to the added to visual representation. In some embodiments, the graphical modeling tool 320 may highlight, draw a shape around, or otherwise visually mark element 341.

In further embodiments, graphical modeling tool 320 may provide a drop down menu such as a smart tag in close proximity to the element 341. As discussed, the smart tag may include solution information 314 that was included in a declarative constraint 310. In such case, the underlying code, when executed, causes graphical modeling tool 320 to access the solution information in the declarative constraint and to generate appropriate code for displaying this information in the smart tag. The designer user 370 may then read the smart tag information and ascertain what steps should be taken to fix the error in the graphical model. In other embodiments, graphical modeling tool 320 may generate executable code that fixes the error when executed for inclusion in the smart tag as described.

Figure 6:
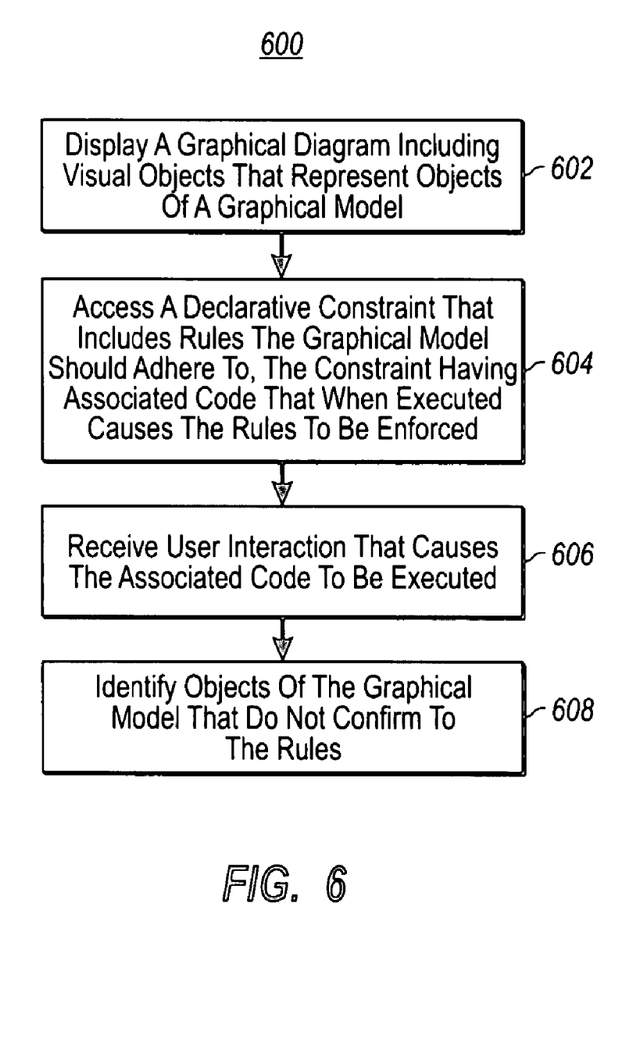
FIG. 6 illustrates a flowchart of a method for dynamically identifying non-compliance with a constraint in accordance with an additional embodiment disclosed herein.

FIG. 6 illustrates an additional method 600 for dynamically identifying non-compliance with a constraint. As with the other method previously discussed, method 600 will be described with reference to computing system 300.

Method 600 includes displaying 602 a graphical diagram including one or more visual objects that represent one or more objects of the graphical model. For example, graphical modeling tool 320 may display visual diagram 340. Visual diagram 340 includes a visual object 341 that visually represents object 331. The other visual objects of visual diagram 340 may represent the other objects of graphical model 330.

Method 600 also includes accessing 604 a declarative constraint that includes one or more rules that the graphical model should adhere to in order to comply with the declarative constraint, the declarative constraint having associated underlying code that, when executed, causes the one or more rules to be enforced against the graphical model. For example, graphical modeling tool 320 may access a declarative constraint 310 in the manner previously described. As mentioned, the declarative constraint 310 may include one or more rules 311 that graphical model 330 should adhere to. The declarative constraint 310 is associated with underlying code that when executed causes the rules 311 to be enforced as explained.

Method 600 further includes receiving 606 user interaction (s) that causes the underlying code to be executed. For example, graphical modeling tool 320 may receive user interaction from designer user 370 that triggers the execution of the underlying code. Examples of such user interaction include opening a graphical model, saving a graphical model, or interacting with a menu such as a context menu that triggers the execution of the code.

Method 600 additionally includes identifying 608 objects of the graphical model that do not conform to the one or more rules of the declarative constraint. For example, the underlying code of a constraint 310 may be enforced against graphical model 330. Any non-conforming objects may then be passed back to graphical modeling tool 320, where they may be displayed or otherwise identified on task list 360 as previously described.

Figure 7A:
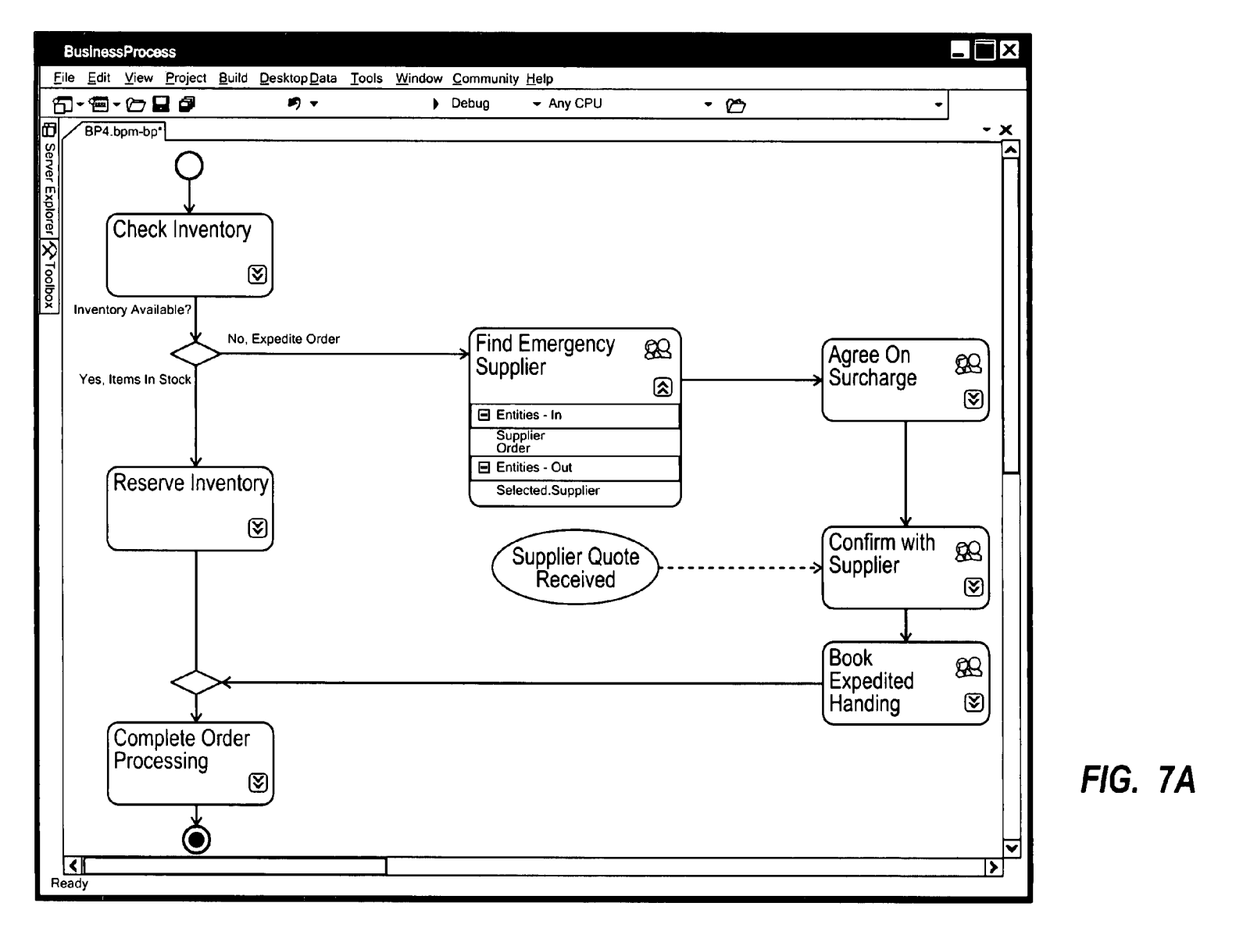
FIGS. 7A-7D illustrate a specific example of an error validation framework of the embodiments disclosed herein.

Having described the principles of the present invention and some specific examples, a more specific example will now be described with respect to FIGS. 7A through 7D. FIG. 7A shows a graphical modeling tool displaying a visual diagram of an underlying graphical model. The shapes of the visual diagram show tasks in a business process. A designer builder wants to ensure that a designer user does not create a loop in the business process and so creates a declarative constraint specifying no loops and integrates it into the declarative definition of the underlying graphical model as explained.

Figure 7B:
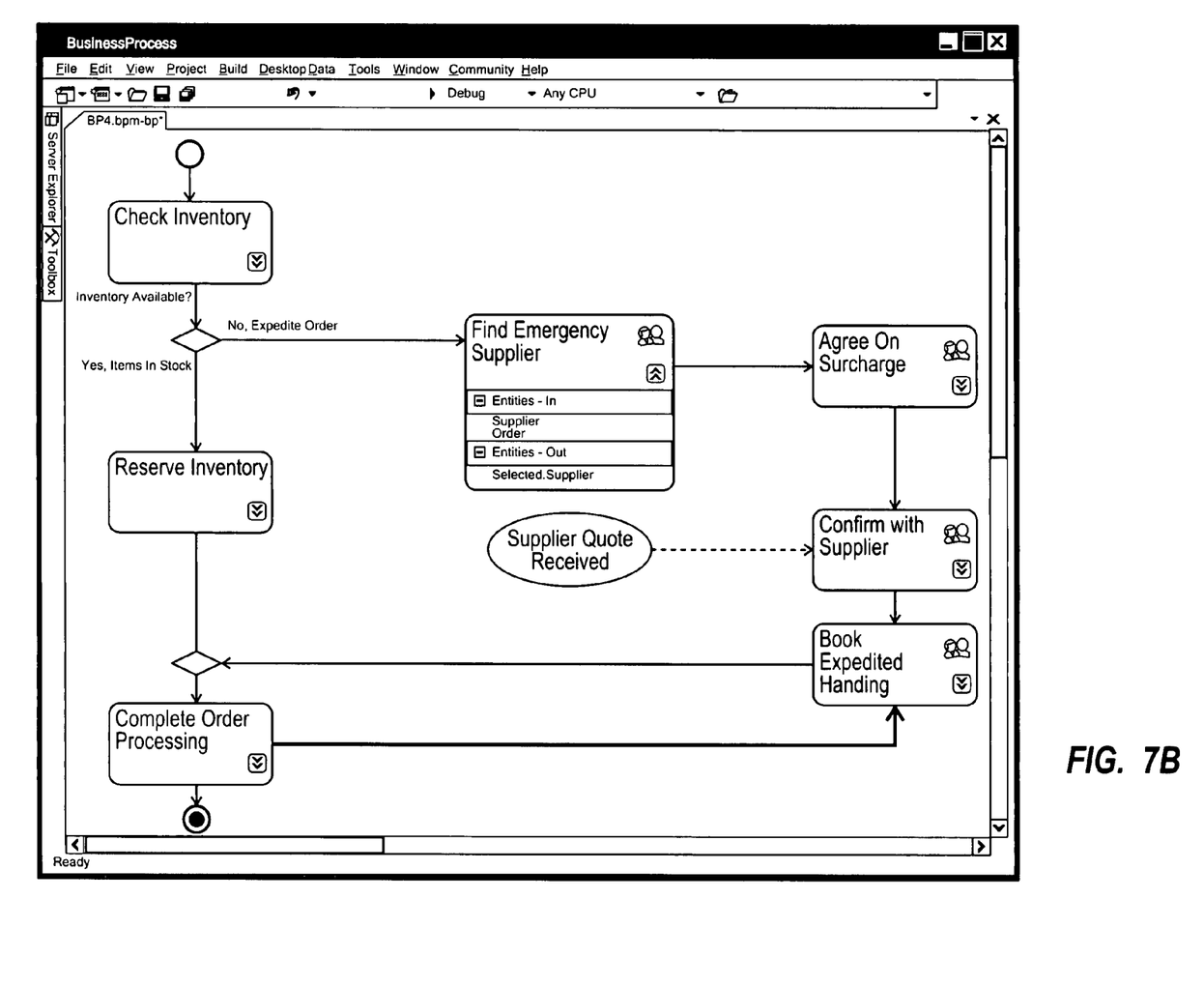

In FIG. 7B, a designer user inadvertently adds a loop between the process step "Complete Order Processing" and the process step "Book Expedited Handling."

Figure 7C:
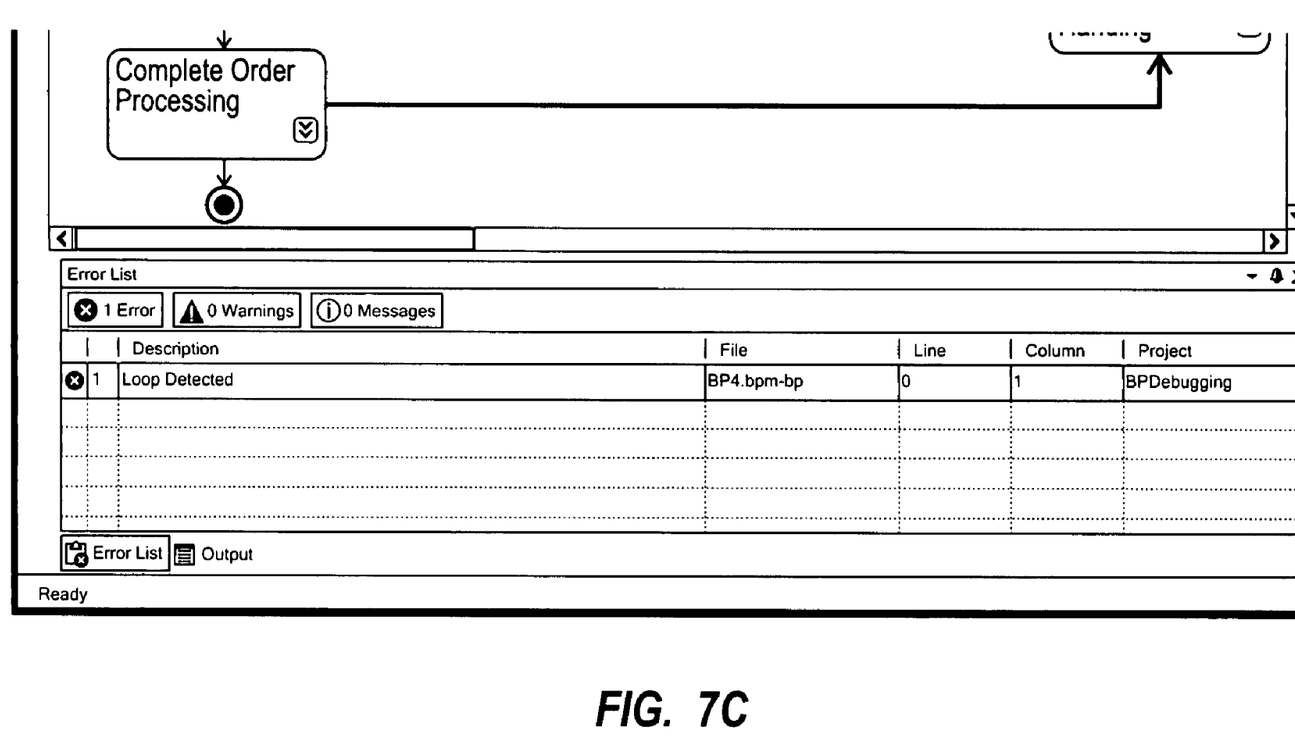

The designer user then provides user interaction that triggers the execution of the underlying constraint code against the underlying graphical model. The execution of the code causes any errors to be identified as discussed above. In FIG. 7C, a task list displays that a loop is detected in the graphical model.

Figure 7D:
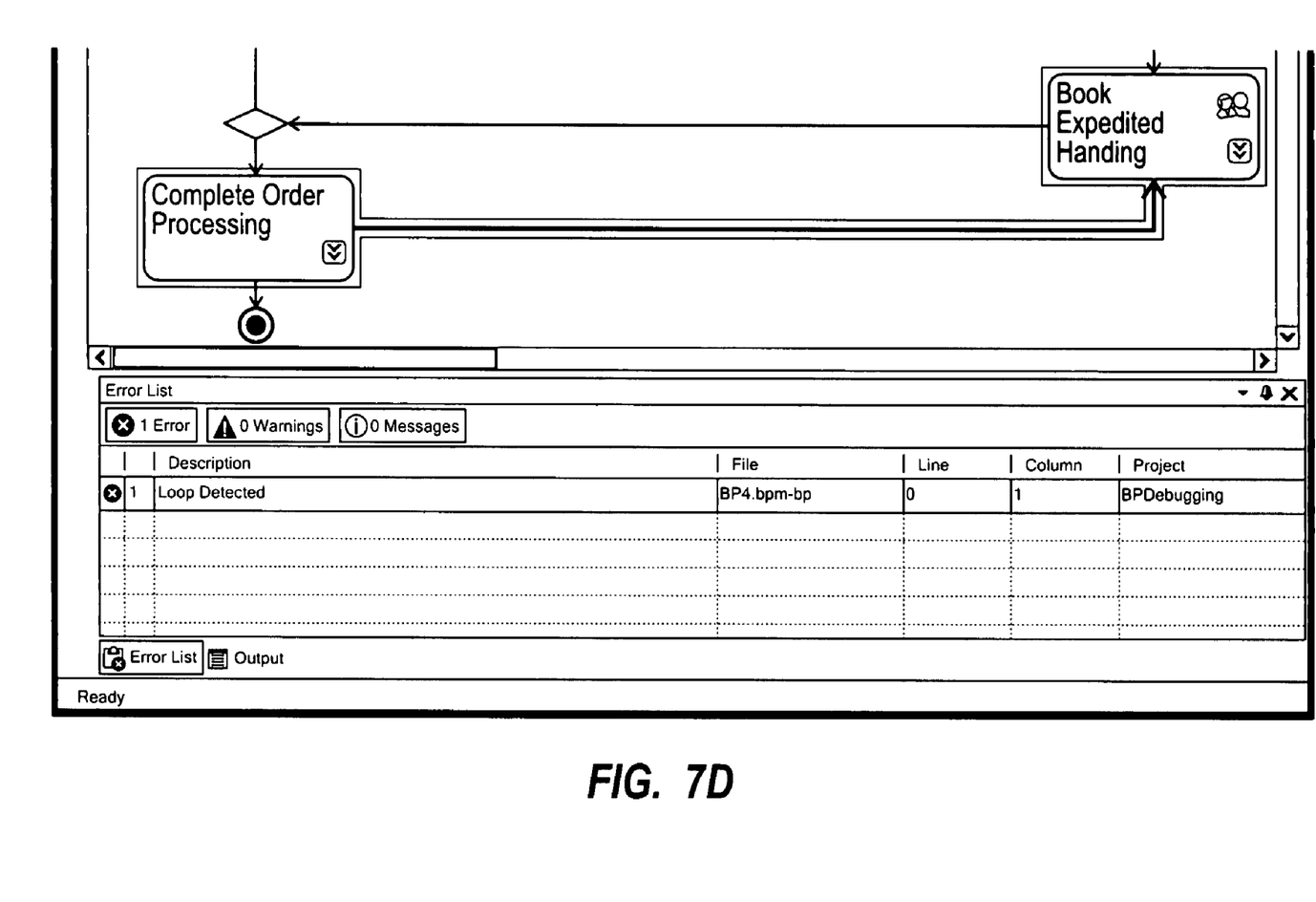

The designer user may then select the displayed loop error. The error validation framework then uses the declarative relationship between the object of the graphical model and the visual diagram as discussed above. The graphical modeling tool then highlights and draws a shape around the loop to inform the designer user of the visual element representing the non-conforming object as is illustrated in FIG. 7D.

Although methods have been described with respect to FIGS. 4-6, the principles of the present invention extend to computer program products comprising one or more computer-readable media having thereon one or more computer-executable instructions that, when executed by one or more processors of the server computing system, cause the computing system to perform all or portions or either of these methods. For instance, referring to FIG. 1, memory 104 and communication channels 108 may represent examples of such computer-readable media. The memory 104 represents an example of physical computer-readable media in the form of physical storage and/or memory media. The principles of the present invention also extend to computing systems themselves that are configured through hardware, software, or a combination of hardware and software, to perform all of portions of the methods of FIGS. 4-6.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer program product comprising one or more computer-readable physical storage media having thereon computer-executable instructions which, when executed by one or more processors of a computing system, causes the computing system to perform a method for allowing declarative statements of constraints to govern how a visualization of a graphical model is validated, the graphical model comprising one or more objects that include interrelationships, at least some of the objects capable of being visualized on a display, the method comprising:

identifying a graphical model that is to be subjected to the declarative constraint the graphical model including notation definitions that specify shapes, connectors, and decorators that are used to visualize objects and relationships of the graphical model;

reading a declarative constraint that comprises one or more rules that the graphical model must adhere to in order to comply with the declarative constraint, the one or more rules specifying how the graphical model should function, and the one or more rules specifying properties, parameters, and relationships that objects of the graphical model should adhere to;

interpreting the declarative constraint to identify or formulate underlying code that when executed causes the one or more rules associated with the declarative constraint to be checked against the identified graphical model;

causing the computing system to execute the underlying code; and rendering on the display the results of checking the one or more rules against the identified graphical model.

2. The computer program product in accordance with claim 1, wherein the declarative constraint specifies an error message that is to be displayed when an object of the graphical model violates the one or more rules of the constraint.

3. The computer program product in accordance with claim 1, wherein the declarative constraint specifies user defined interactions that cause the computing system to execute the underlying code.

4. The computer program product in accordance with claim 1, wherein the computer-readable physical storage media has thereon computer-executable instructions that, when executed by the one or more processors, further cause the computing system to perform the following:

identifying objects of the graphical model that violate the one or more rules of the declarative constraint.

5. The computer program product in accordance with claim 1, wherein the declarative constraint includes solution information that is to be displayed when an object of the graphical model violates the one or more rules of the constraint, the solution information specifying how to correct the rule violations.

6. A computer program product comprising one or more computer-readable physical storage media having thereon computer-executable instructions that are structured such that, when executed by one or more processors of a computing system, the computing system is caused to perform a method for identifying validation errors in a visual representation of a graphical model, the graphical model comprising one or more objects that include interrelationship, at least some of the objects capable of being visualized on a display, the method comprising:

reading a constraint that comprises one or more rules that the graphical model must adhere to in order to comply with the declarative constraint, the one or more rules specifying how the graphical model should function, and the one or more rules specifying properties, parameters, and relationships that objects of the graphical model should adhere to;

imposing the constraint on the graphical model;

identifying an object in the graphical model that does not conform with one or more rules of the constraint imposed on the graphical model;

reading a declarative definition of the graphical model to ascertain a declarative relationship between the non-conforming object of the graphical model and its visual representation that is rendered on a display, the declarative definition including shapes, types, connectors, and decorators;

interpreting the declarative relationship between the non-conforming object of the graphical model and its visual representation to formulate underlying code that when executed causes the computing system to provide a visually distinct attribute related to the visual representation on the display; and causing the computing system to execute the underlying code.

7. The computer program product in accordance with claim 6, wherein identifying an object in the graphical model that does not conform with one or more rules of a constraint that is imposed on the graphical model comprises listing the object in a task list.

8. The computer program product in accordance with claim 6, wherein the computer-readable physical storage media has thereon computer-executable instructions that, when executed by the one or more processors, further cause the computing system to perform the following:

highlighting the visual representation of the non-conforming object.

9. The computer program product in accordance with claim 6, wherein the computer-readable physical storage media has thereon computer-executable instructions that, when executed by the one or more processors, further cause the computing system to perform the following:

drawing a shape around the visual representation of the non-conforming object.

10. The computer program product in accordance with claim 6, wherein the computer-readable physical storage media has thereon computer-executable instructions that, when executed by the one or more processors, further cause the computing system to perform the following:

attaching a smart tag to the visual representation of the non-conforming object.

11. The computer program product in accordance with claim 6, wherein the computer-readable physical storage media has thereon computer-executable instructions that, when executed by the one or more processors, further cause the computing system to perform the following:

accessing information that specifies how to make the non-conforming object conform with the one or more rules; and displaying the information using a User Interface or as a smart tag that is placed in close proximity to the visual representation.

12. The computer program product in accordance with claim 6, wherein the computer-readable physical storage media has thereon computer-executable instructions that, when executed by the one or more processors, further cause the computing system to perform the following:

accessing information that specifies how to make the non-conforming object conform with the one or more rules; and formulating underlying code that when executed causes the computing system to make the non-conforming object conform with the one or more rules.

13. The computer program product in accordance with claim 6, wherein the one or more computer-readable physical storage media is one of physical memory media and physical storage media.

14. Within a computing system that includes a graphical modeling tool that is used for creating, displaying and modifying a graphical model of an overall system or process, the graphical model comprising one or more objects that include interrelationships, at least some of the objects capable of being visualized as one or more visual diagrams, a method for dynamically identifying non-compliance with a constraint, the method comprising:

displaying a graphical diagram including one or more visual objects that represent one or more objects of the graphical model, the graphical model including notation definitions that specify shapes, connectors, and decorators that are used to visualize objects and relationships of the graphical model;

accessing a declarative constraint that includes one or more rules that the graphical model must adhere to in order to comply with the declarative constraint, the one or more rules specifying how the graphical model should function, and the one or more rules specifying properties, parameters, and relationships that objects of the graphical model should adhere to, the declarative constraint having associated underlying code that, when executed, causes the one or more rules to be checked against the graphical model;

receiving a user interaction that causes the underlying code to be executed;

identifying objects of the graphical model that do not conform to the one or more rules of the declarative constraint; and rendering on a display the results of checking the one or more rules against the identified graphical model.

15. The method in accordance with claim 14 wherein identifying the objects of the graphical model that do not conform to the one or more rules comprises displaying a list of the non-conforming objects in a user interface (UI) element.

16. The method in accordance with claim 14 further comprising:

receiving user input that selects one of the non-conforming objects; and in response to the selection, highlighting a visual representation of the selected non-conforming object.

17. The method in accordance with claim 14 further comprising:

receiving user input that selects one of the non-conforming objects; and in response to the selection, attaching a smart tag to a visual representation of the selected non-conforming object.

18. The method in accordance with claim 14 further comprising:

receiving user input that selects one of the non-conforming objects; and in response to the selection, drawing a shape around a visual representation of the selected non-conforming object.

* * * * *